(12) United States Patent
Rowe

(10) Patent No.: US 11,413,746 B2
(45) Date of Patent: Aug. 16, 2022

(54) ARTIFICIAL MUSCLE STACKS COMPRISING ALTERNATINGLY OFFSET ARTIFICIAL MUSCLE LAYERS

(71) Applicant: Toyota Motor Engineering & Manufacturing North America, Inc., Plano, TX (US)

(72) Inventor: Michael P. Rowe, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 67 days.

(21) Appl. No.: 17/165,468

(22) Filed: Feb. 2, 2021

(65) Prior Publication Data

US 2022/0176550 A1 Jun. 9, 2022

Related U.S. Application Data

(60) Provisional application No. 63/122,982, filed on Dec. 9, 2020.

(51) Int. Cl.
*B25J 9/10* (2006.01)
*F15B 15/10* (2006.01)
(Continued)

(52) U.S. Cl.
CPC .............. *B25J 9/1075* (2013.01); *B25J 9/142* (2013.01); *F15B 15/103* (2013.01); *H02N 1/002* (2013.01)

(58) Field of Classification Search
CPC .......... B25J 9/142; B25J 9/1075; F15B 15/00; F15B 15/103
See application file for complete search history.

(56) References Cited

U.S. PATENT DOCUMENTS 7,679,261 B2   3/2010  Chappaz et al.
10,233,910 B2  3/2019  Mazzeo et al.
(Continued)

FOREIGN PATENT DOCUMENTS

CN   209812321 U   12/2019
JP   2007097292 A  4/2007
(Continued)

OTHER PUBLICATIONS

Shane Mitchell, et al., "An Easy-to-Implement Toolkit to Create Versatile and High-Performance HASEL Actuators for Untethered Soft Robots," Journal Article, Advanced Science 6(14):1900178, Jun. 2019, URL: https://www.researchgate.net/figure/Generalized-principle-of-zipping-mode-actuation-in-HASEL-actuators-As-voltage-is_fig1_333725822, 15 pages.

(Continued)

*Primary Examiner* — Thomas E Lazo
*Assistant Examiner* — Daniel S Collins
(74) *Attorney, Agent, or Firm* — Dinsmore & Shohl LLP

(57) ABSTRACT

An artificial muscle stack that includes a plurality of artificial muscle layers. Each artificial muscle layer includes one or more artificial muscles having a housing with an electrode region and an expandable fluid region, a dielectric fluid housed within the housing, and an electrode pair having a first and second electrode positioned in the electrode region. The first and second electrodes each include two or more tab portions and two or more bridge portions. The two or more bridge portions interconnects adjacent tab portions. At least one of the first and second electrode includes a central opening positioned between the tab portions and encircling the expandable fluid region. The plurality of artificial muscle layers are arranged such that the expandable fluid region of the artificial muscles of each artificial muscle layer overlaps (Continued)

at least one tab portion of one or more artificial muscles of an adjacent artificial muscle layer.

20 Claims, 11 Drawing Sheets

(51) Int. Cl.
    *B25J 9/14*     (2006.01)
    *H02N 1/00*     (2006.01)

(56) References Cited

U.S. PATENT DOCUMENTS

| 10,406,698 | B2 | 9/2019 | Morin et al. |
| 2007/0120438 | A1 | 5/2007 | Divoux |

FOREIGN PATENT DOCUMENTS

| WO | 2019002860 A1 | 1/2019 |
| WO | 2019173227 A1 | 9/2019 |

OTHER PUBLICATIONS

E. Acome, et al., "Hydraulically Amplified Self-Healing Electrostatic Actuators With Muscle-Like Performance," Science Journal, Jan. 5, 2018: vol. 359, Issue 6371, pp. 61-651, Department of Mechanical Engineering & Materials Science and Engineering Program, University of Colorado, Boulder, CO 80309, USA.

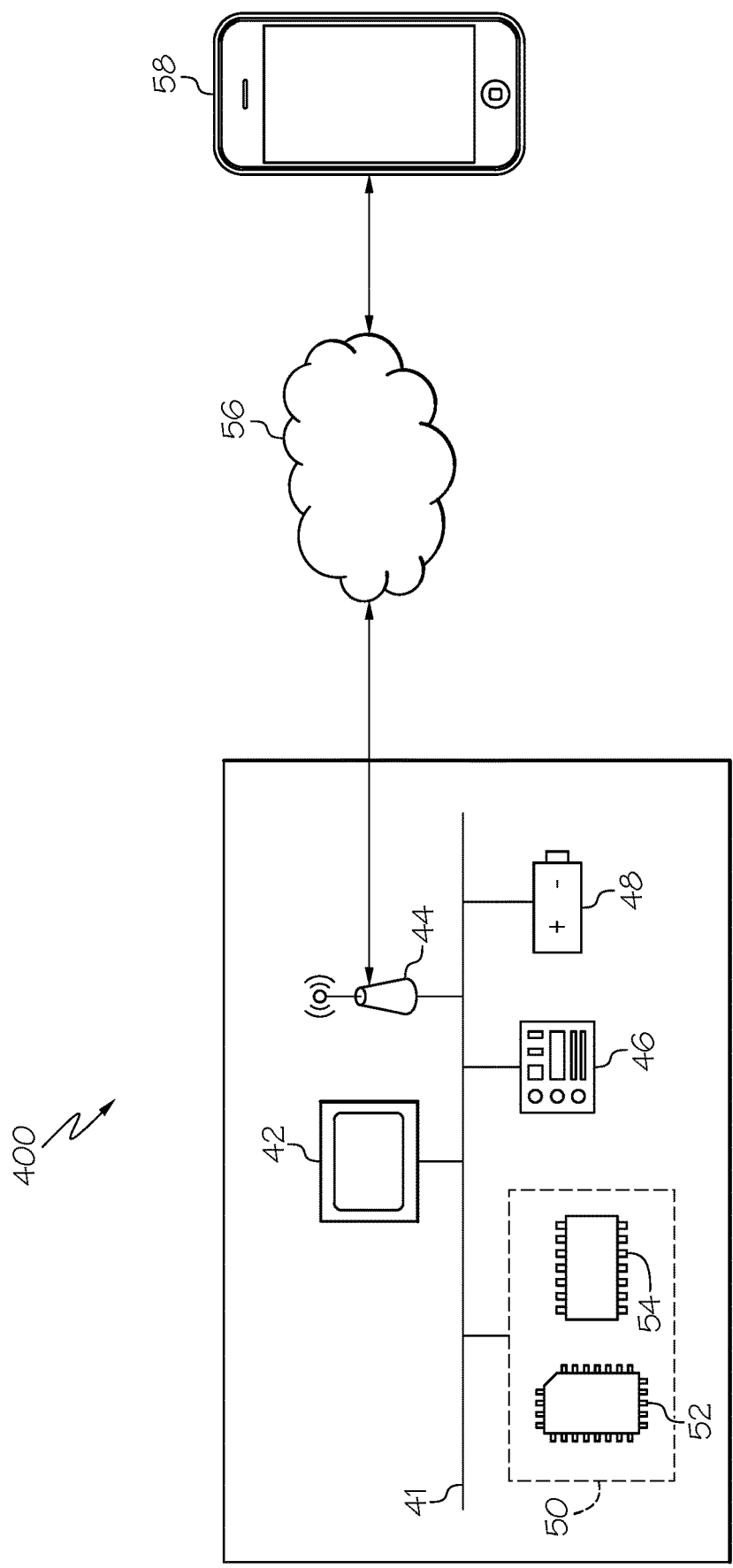

ARTIFICIAL MUSCLE STACKS COMPRISING ALTERNATINGLY OFFSET ARTIFICIAL MUSCLE LAYERS

TECHNICAL FIELD

The present specification generally relates to stacks and arrangements of artificial muscles.

BACKGROUND

Current robotic technologies rely on rigid components, such as servomotors to perform tasks, often in a structured environment. This rigidity presents limitations in many robotic applications, caused, at least in part, by the weight-to-power ratio of servomotors and other rigid robotics devices. The field of soft robotics improves on these limitations by using artificial muscles and other soft actuators. Artificial muscles attempt to mimic the versatility, performance, and reliability of a biological muscle. Some artificial muscles rely on fluidic actuators, but fluidic actuators require a supply of pressurized gas or liquid, and fluid transport must occur through systems of channels and tubes, limiting the speed and efficiency of the artificial muscles. Other artificial muscles use thermally activated polymer fibers, but these are difficult to control and operate at low efficiencies.

One particular artificial muscle design is described in the paper titled "Hydraulically amplified self-healing electrostatic actuators with muscle-like performance" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). These hydraulically amplified self-healing electrostatic (HASEL) actuators use electrostatic and hydraulic forces to achieve a variety of actuation modes. However, HASEL actuator artificial muscles have a limited actuator power per unit volume. Furthermore, HASEL actuator artificial muscles and other known artificial muscles are difficult to combine in a small footprint while increasing the achievable collective force of these artificial muscle combinations.

Accordingly, a need exists for improved artificial muscles with increased actuator power per unit volume and small footprint arrangements of these improved artificial muscles.

SUMMARY

In one embodiment, an artificial muscle stack includes a plurality of artificial muscle layers. Each artificial muscle layer includes one or more artificial muscles and the one or more artificial muscles include a housing having an electrode region and an expandable fluid region, a dielectric fluid housed within the housing, and an electrode pair having a first electrode and a second electrode positioned in the electrode region of the housing. The first electrode and the second electrode each include two or more tab portions and two or more bridge portions. Each of the two or more bridge portions interconnects adjacent tab portions. At least one of the first electrode and the second electrode includes a central opening positioned between the two or more tab portions and encircling the expandable fluid region. In addition, the plurality of artificial muscle layers are arranged such that the expandable fluid region of the one or more artificial muscles of each artificial muscle layer overlaps at least one tab portion of one or more artificial muscles of an adjacent artificial muscle layer.

In another embodiment, an artificial muscle stack includes three or more artificial muscle layers. Each artificial muscle layer includes one or more artificial muscles. The one or more artificial muscles include a housing having an electrode region and an expandable fluid region, a dielectric fluid housed within the housing, and an electrode pair having a first electrode and a second electrode positioned in the electrode region of the housing. The first electrode and the second electrode each include two or more tab portions and two or more bridge portions. Each of the two or more bridge portions interconnects adjacent tab portions. At least one of the first electrode and the second electrode includes a central opening positioned between the two or more tab portions and encircling the expandable fluid region. Furthermore, each inner artificial muscle layer is offset a first adjacent artificial muscle layer along a first tab axis and offset a second adjacent artificial muscle layer along a second tab axis where each tab axis extends from a center axis of the expandable fluid region to an end of at least one of the tab portion of the one or more artificial muscles of the inner artificial muscle layer.

In yet another embodiment, a method for actuating an artificial muscle stack includes generating a voltage using a power supply electrically coupled to an electrode pair of each artificial muscle of a plurality of artificial muscle layers. Each artificial muscle includes a housing having an electrode region and an expandable fluid region, a dielectric fluid is housed within the housing, and the electrode pair includes a first electrode and a second electrode and is positioned in the electrode region of the housing. The first electrode and the second electrode each include two or more tab portions and two or more bridge portions, each of the two or more bridge portions interconnects adjacent tab portions, and at least one of the first electrode and the second electrode include a central opening positioned between the two or more tab portions and encircling the expandable fluid region. The plurality of artificial muscle layers are arranged such that the expandable fluid region of each artificial muscle of each artificial muscle layer overlaps at least one tab portion of one or more artificial muscles of an adjacent artificial muscle layer. The method further includes applying the voltage to the electrode pair of at least one artificial muscle of at least one of the plurality of artificial muscle layers, thereby actuating the electrode pair of the at least one artificial muscle from a non-actuated state to an actuated state such that dielectric fluid is directed into the expandable fluid region of the housing and expands the expandable fluid region.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8 schematically depicts an actuation system for operating the artificial muscles of the artificial muscle stacks of FIGS. 5A-7, according to one or more embodiments shown and described herein.

DETAILED DESCRIPTION

Figure 1:
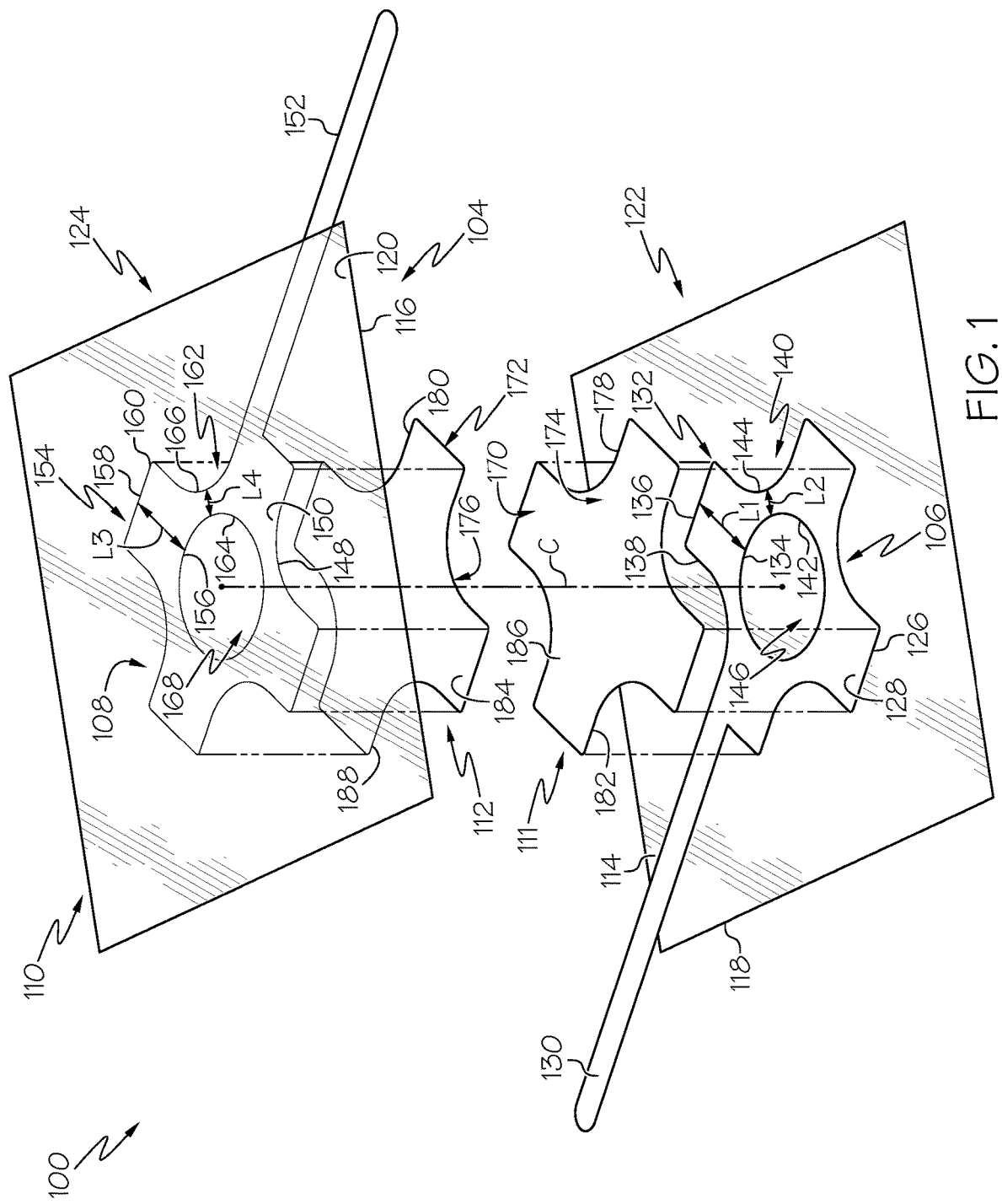
FIG. 1 schematically depicts an exploded view of an illustrative artificial muscle, according to one or more embodiments shown and described herein.

Embodiments described herein are directed to an artificial muscle stack that includes a plurality of artificial muscle layers each having at least one artificial muscle that are arranged to maximum the packing together of individual artificial muscles. Each individual artificial muscle described herein is actuatable to selectively raise and lower a region of the artificial muscles to provide a selective, on demand inflated expandable fluid region. In particular, the one or more artificial muscles each include an electrode pair that may be drawn together by application of a voltage, thereby pushing dielectric fluid into the expandable fluid region, expanding the expandable fluid region, raising a portion of the artificial muscle on demand. The first electrode and the second electrode each includes two or more tab portions and two or more bridge portions interconnecting adjacent tab portions, and at least one of the first electrode and the second electrode includes a central opening positioned between the tab portions and encircles the expandable fluid region. The tab portion and bridge portion design of the electrode pair facilitates a zippering actuation motion to increase the force per unit volume achievable by actuation of the artificial muscle.

For some applications, individual artificial muscles do not generate a sufficient actuation force to perform some desired functionalities. In these applications, it may be useful to arrange stacks of artificial muscles arranged in layered arrays to increase available actuation force. However, increasing the number of artificial muscles in each layer increases the footprint of the artificial muscle stack. In some applications, it may be useful to minimize the footprint of the artificial muscle stack while retaining the benefits of increased actuation force. The embodiments described herein are directed to an artificial muscle stack comprising a plurality of artificial muscle layers stacked in an alternatingly offset arrangement such that each expandable fluid region of the one or more artificial muscles of each artificial muscle layer overlaps at least one tab portion of one or more artificial muscles of an adjacent artificial muscle layer. This alternating offset arrangement increases the number of artificial muscles that may be arranged in a particular footprint, facilitating an increase in the achievable actuation force of the artificial muscle stack while retaining a small footprint. Various embodiments of the artificial muscle stack are described in more detail herein. Whenever possible, the same reference numerals will be used throughout the drawings to refer to the same or like parts.

Figure 2:
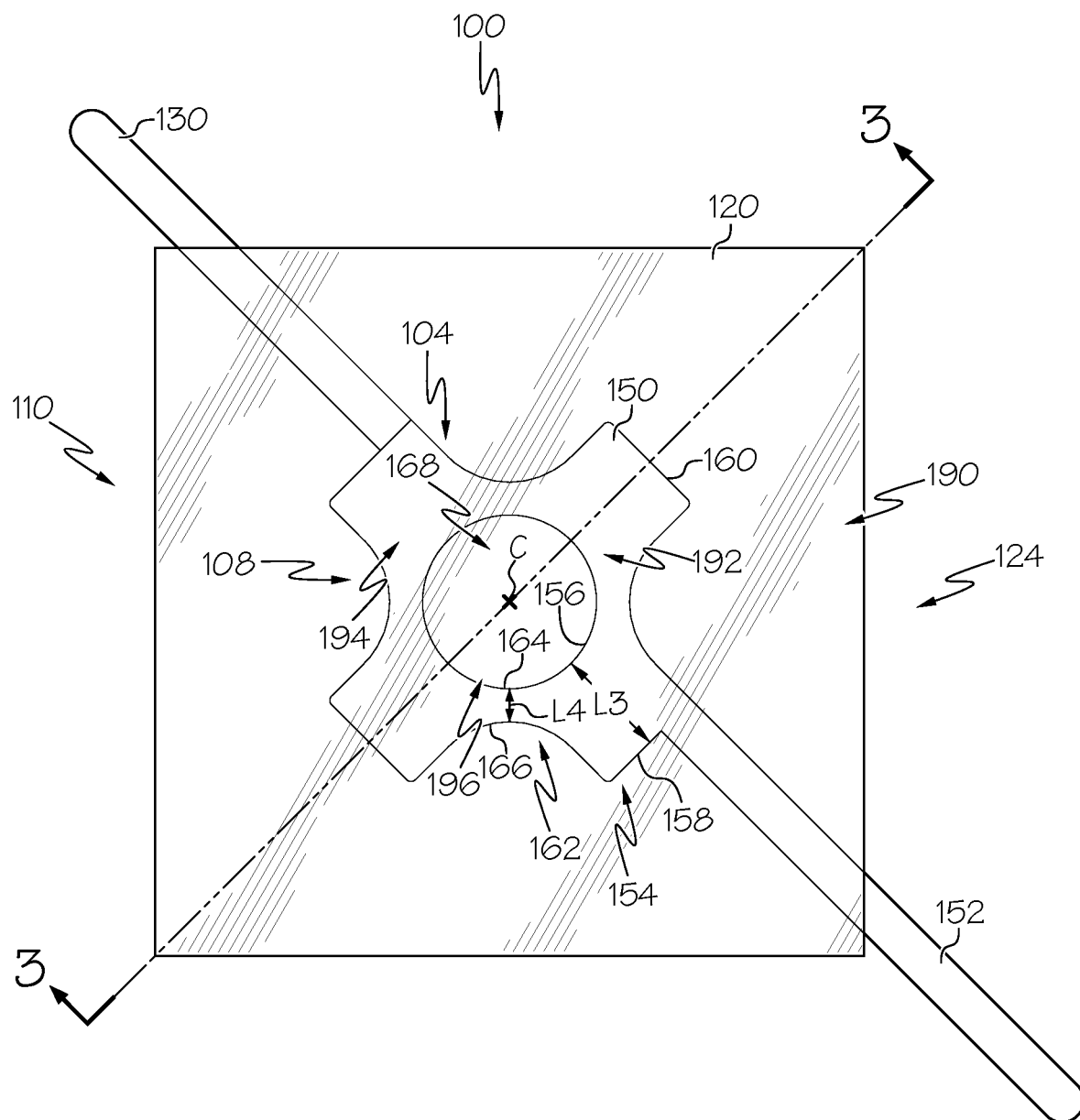
FIG. 2 schematically depicts a top view of the artificial muscle of FIG. 1, according to one or more embodiments shown and described herein.

Referring now to FIGS. 1 and 2, an example artificial muscle 100 that may be disposed in an artificial muscle stack 201, 301, 301' (FIGS. 5A-7) is schematically depicted. The artificial muscle 100 comprises a housing 110, the electrode pair 104, including a first electrode 106 and a second electrode 108, fixed to opposite surfaces of the housing 110, a first electrical insulator layer 111 fixed to the first electrode 106, and a second electrical insulator layer 112 fixed to the second electrode 108. In some embodiments, the housing 110 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 110 are heat-sealable. In other embodiments, the housing 110 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120.

While the embodiments described herein primarily refer to the housing 110 as comprising the first film layer 122 and the second film layer 124, as opposed to the one-piece housing, it should be understood that either arrangement is contemplated. In some embodiments, the first film layer 122 and the second film layer 124 generally include the same structure and composition. For example, in some embodiments, the first film layer 122 and the second film layer 124 each comprises biaxially oriented polypropylene.

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 100 is negatively charged.

Figure 7:
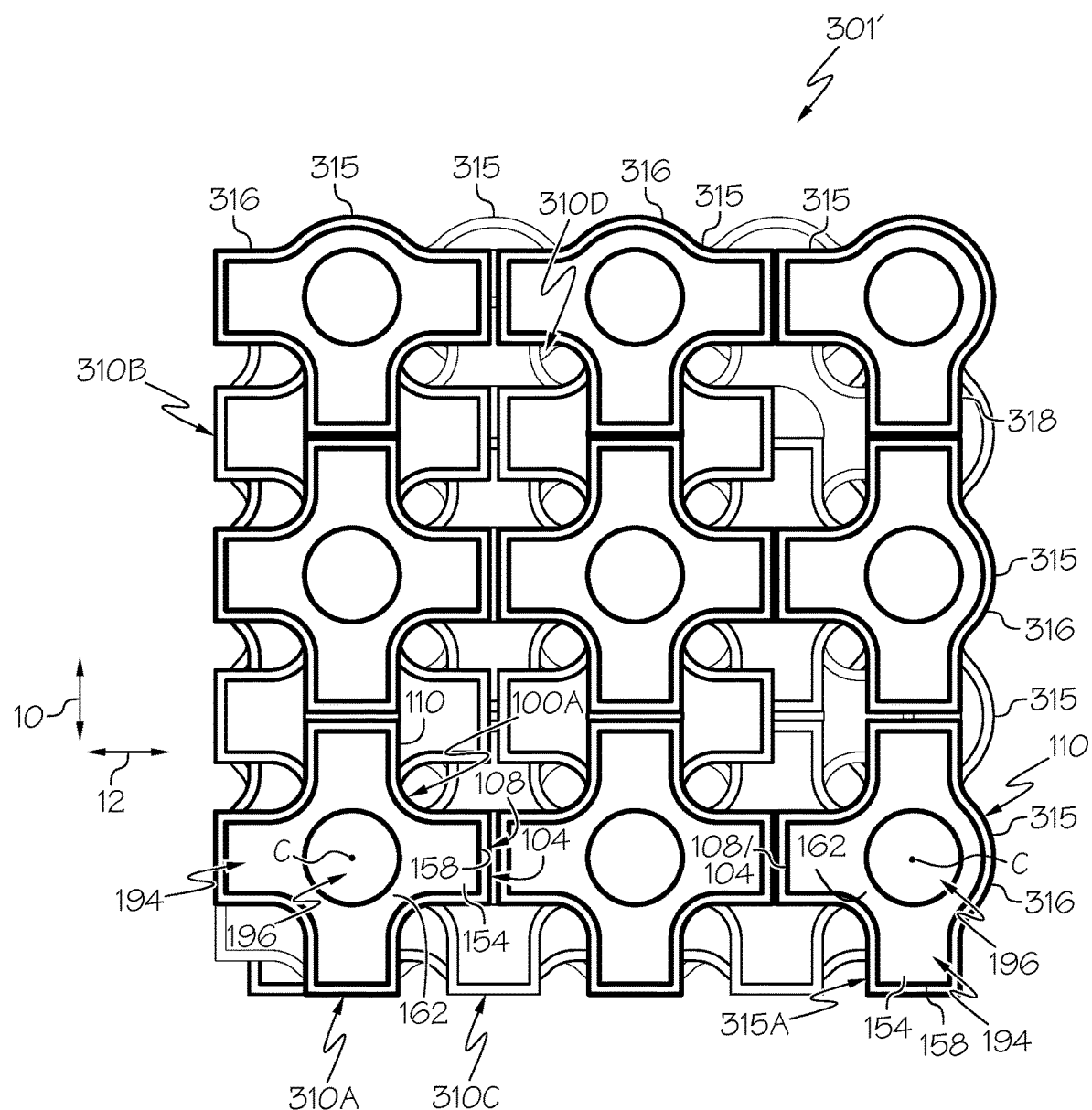
FIG. 7 schematically depicts a top view of an example artificial muscle stack comprising a plurality of artificial muscle layers positioned in alternatingly offset arrangement with the addition of perimeter artificial muscles, according to one or more embodiments shown and described herein.

The first electrode 106 has a film-facing surface 126 and an opposite inner surface 128. The first electrode 106 is positioned against the first film layer 122, specifically, the first inner surface 114 of the first film layer 122. In addition, the first electrode 106 includes a first terminal 130 extending from the first electrode 106 past an edge of the first film layer 122 such that the first terminal 130 can be connected to a power supply to actuate the first electrode 106. Specifically, the terminal is coupled, either directly or in series, to a power supply and a controller of an actuation system 400, as shown in FIG. 7. Similarly, the second electrode 108 has a film-facing surface 148 and an opposite inner surface 150. The second electrode 108 is positioned against the second film layer 124, specifically, the second inner surface 116 of the second film layer 124. The second electrode 108 includes a second terminal 152 extending from the second electrode 108 past an edge of the second film layer 124 such that the second terminal 152 can be connected to a power supply and a controller of the actuation system 400 to actuate the second electrode 108.

The first electrode 106 includes two or more tab portions 132 and two or more bridge portions 140. Each bridge portion 140 is positioned between adjacent tab portions 132, interconnecting these adjacent tab portions 132. Each tab portion 132 has a first end 134 extending radially from a center axis C of the first electrode 106 to an opposite second end 136 of the tab portion 132, where the second end 136 defines a portion of an outer perimeter 138 of the first electrode 106. Each bridge portion 140 has a first end 142 extending radially from the center axis C of the first electrode 106 to an opposite second end 144 of the bridge portion 140 defining another portion of the outer perimeter 138 of the first electrode 106. Each tab portion 132 has a tab length L1 and each bridge portion 140 has a bridge length L2 extending in a radial direction from the center axis C of the first electrode 106. The tab length L1 is a distance from the first end 134 to the second end 136 of the tab portion 132 and the bridge length L2 is a distance from the first end 142 to the second end 144 of the bridge portion 140. The tab length L1 of each tab portion 132 is longer than the bridge length L2 of each bridge portion 140. In some embodiments, the bridge length L2 is 20% to 50% of the tab length L1, such as 30% to 40% of the tab length L1.

In some embodiments, the two or more tab portions 132 are arranged in one or more pairs of tab portions 132. Each pair of tab portions 132 includes two tab portions 132 arranged diametrically opposed to one another. In some embodiments, the first electrode 106 may include only two tab portions 132 positioned on opposite sides or ends of the first electrode 106. In some embodiments, as shown in FIGS. 1 and 2, the first electrode 106 includes four tab portions 132 and four bridge portions 140 interconnecting adjacent tab portions 132. In this embodiment, the four tab portion 132 are arranged as two pairs of tab portions 132 diametrically opposed to one another. Furthermore, as shown, the first terminal 130 extends from the second end 136 of one of the tab portions 132 and is integrally formed therewith.

Like the first electrode 106, the second electrode 108 includes at least a pair of tab portions 154 and two or more bridge portions 162. Each bridge portion 162 is positioned between adjacent tab portions 154, interconnecting these adjacent tab portions 154. Each tab portion 154 has a first end 156 extending radially from a center axis C of the second electrode 108 to an opposite second end 158 of the tab portion 154, where the second end 158 defines a portion of an outer perimeter 160 of the second electrode 108. Due to the first electrode 106 and the second electrode 108 being coaxial with one another, the center axis C of the first electrode 106 and the second electrode 108 are the same. Each bridge portion 162 has a first end 164 extending radially from the center axis C of the second electrode to an opposite second end 166 of the bridge portion 162 defining another portion of the outer perimeter 160 of the second electrode 108. Each tab portion 154 has a tab length L3 and each bridge portion 162 has a bridge length L4 extending in a radial direction from the center axis C of the second electrode 108. The tab length L3 is a distance from the first end 156 to the second end 158 of the tab portion 154 and the bridge length L4 is a distance from the first end 164 to the second end 166 of the bridge portion 162. The tab length L3 is longer than the bridge length L4 of each bridge portion 162. In some embodiments, the bridge length L4 is 20% to 50% of the tab length L3, such as 30% to 40% of the tab length L3.

In some embodiments, the two or more tab portions 154 are arranged in one or more pairs of tab portions 154. Each pair of tab portions 154 includes two tab portions 154 arranged diametrically opposed to one another. In some embodiments, the second electrode 108 may include only two tab portions 154 positioned on opposite sides or ends of the first electrode 106. In some embodiments, as shown in FIGS. 1 and 2, the second electrode 108 includes four tab portions 154 and four bridge portions 162 interconnecting adjacent tab portions 154. In this embodiment, the four tab portions 154 are arranged as two pairs of tab portions 154 diametrically opposed to one another. Furthermore, as shown, the second terminal 152 extends from the second end 158 of one of the tab portions 154 and is integrally formed therewith.

Figure 3A:
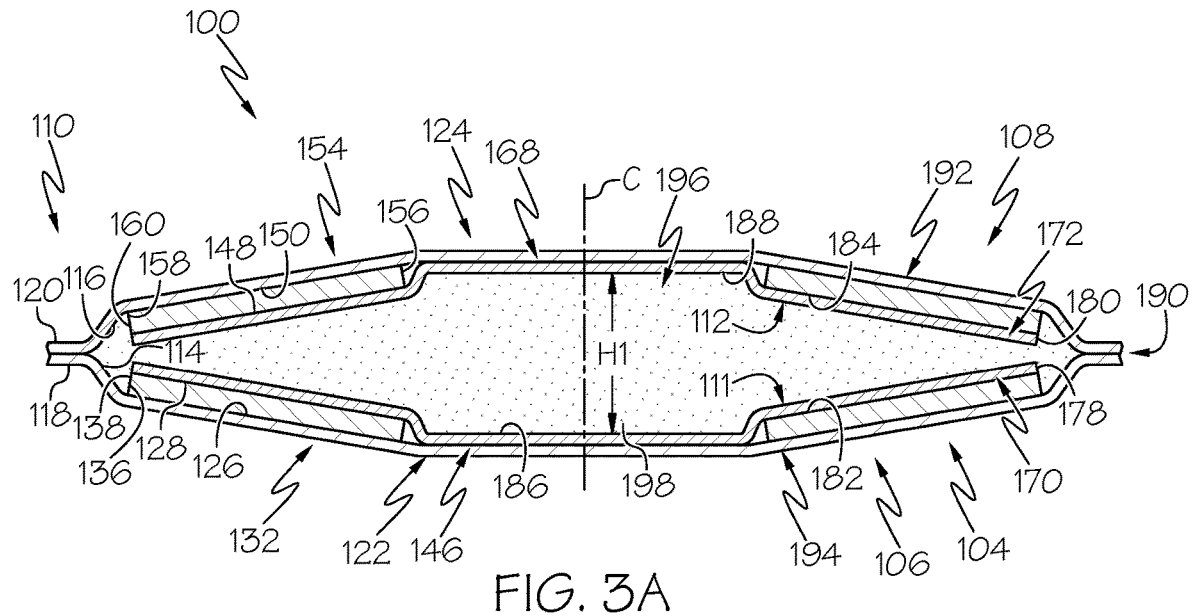
FIG. 3A schematically depicts a cross-sectional view of the artificial muscle of FIGS. 1 and 2 taken along line 3-3 in FIG. 2 in a non-actuated state, according to one or more embodiments shown and described herein.
Figure 3B:
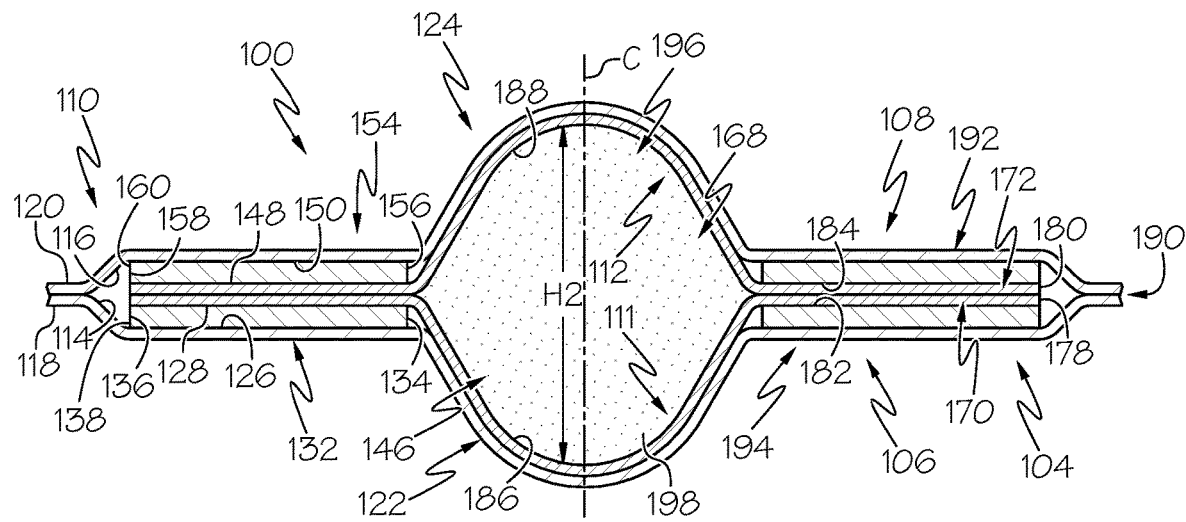
FIG. 3B schematically depicts a cross-sectional view of the artificial muscle of FIG. 1 taken along line 3-3 in FIG. 2 in an actuated state, according to one or more embodiments shown and described herein.
Figure 4A:
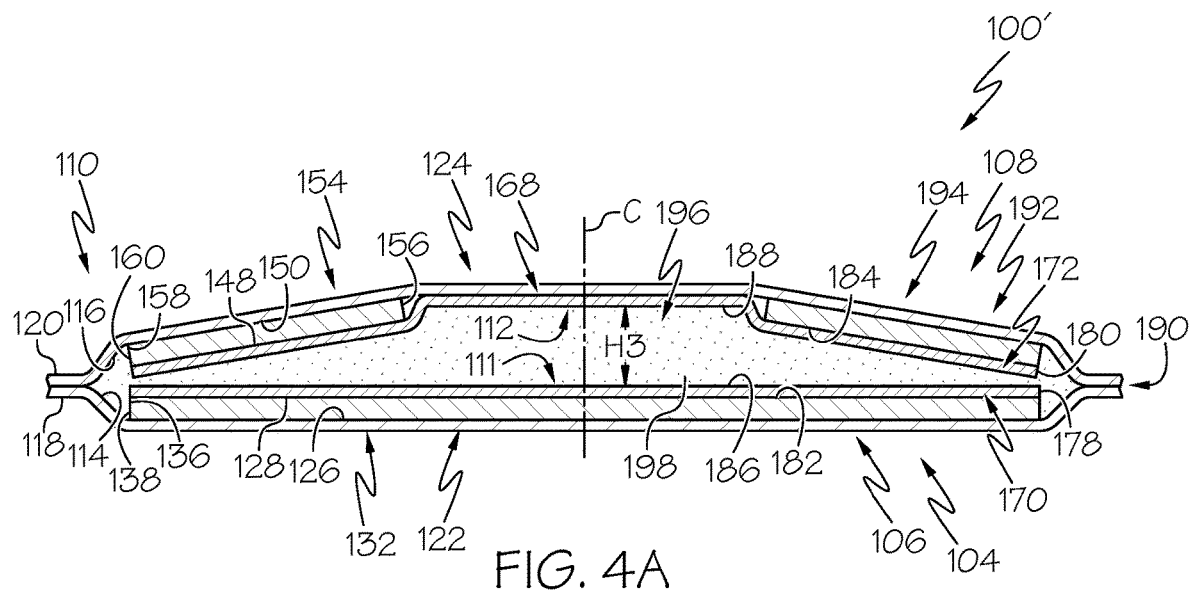
FIG. 4A schematically depicts a cross-sectional view of another illustrative artificial muscle in a non-actuated state, according to one or more embodiments shown and described herein.
Figure 4B:
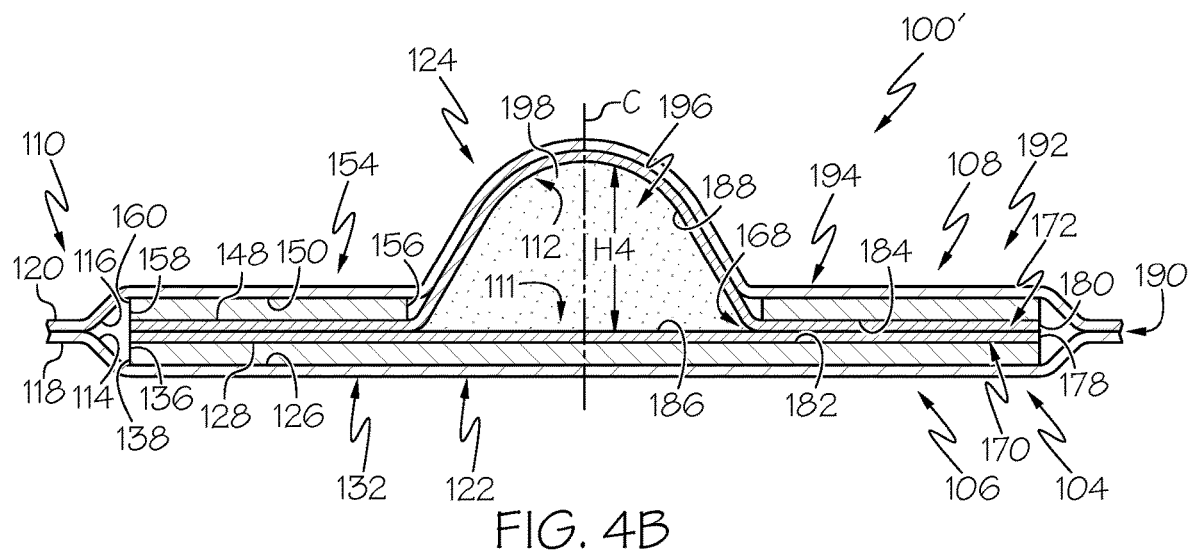
FIG. 4B schematically depicts a cross-sectional view of the artificial muscle of FIG. 4A in an actuated state, according to one or more embodiments shown and described herein.

Referring now to FIGS. 1-4B, at least one of the first electrode 106 and the second electrode 108 has a central opening formed therein between the first end 134 of the tab portions 132 and the first end 142 of the bridge portions 140. In FIGS. 3A and 3B, the first electrode 106 has a central opening 146. However, it should be understood that the first electrode 106 does not need to include the central opening 146 when a central opening is provided within the second electrode 108, as shown in FIGS. 4A and 4B. Alternatively, the second electrode 108 does not need to include the central opening when the central opening 146 is provided within the first electrode 106. Referring still to FIGS. 1-4B, the first electrical insulator layer 111 and the second electrical insulator layer 112 have a geometry generally corresponding to the first electrode 106 and the second electrode 108, respectively. Thus, the first electrical insulator layer 111 and the second electrical insulator layer 112 each have tab portions 170, 172 and bridge portions 174, 176 corresponding to like portions on the first electrode 106 and the second electrode 108. Further, the first electrical insulator layer 111 and the second electrical insulator layer 112 each have an outer perimeter 178, 180 corresponding to the outer perimeter 138 of the first electrode 106 and the outer perimeter 160 of the second electrode 108, respectively, when positioned thereon.

It should be appreciated that, in some embodiments, the first electrical insulator layer 111 and the second electrical insulator layer 112 generally include the same structure and composition. As such, in some embodiments, the first electrical insulator layer 111 and the second electrical insulator layer 112 each include an adhesive surface 182, 184 and an opposite non-sealable surface 186, 188, respectively. Thus, in some embodiments, the first electrical insulator layer 111 and the second electrical insulator layer 112 are each a polymer tape adhered to the inner surface 128 of the first electrode 106 and the inner surface 150 of the second electrode 108, respectively.

Referring now to FIGS. 2-4B, the artificial muscle 100 is shown in its assembled form with the first terminal 130 of the first electrode 106 and the second terminal 152 of the second electrode 108 extending past an outer perimeter of the housing 110, i.e., the first film layer 122 and the second film layer 124. As shown in FIG. 2, the second electrode 108 is stacked on top of the first electrode 106 and, therefore, the first electrode 106, the first film layer 122, and the second film layer 124 are not shown. In its assembled form, the first electrode 106, the second electrode 108, the first electrical insulator layer 111, and the second electrical insulator layer 112 are sandwiched between the first film layer 122 and the second film layer 124. The first film layer 122 is partially sealed to the second film layer 124 at an area surrounding the outer perimeter 138 of the first electrode 106 and the outer perimeter 160 of the second electrode 108. In some embodiments, the first film layer 122 is heat-sealed to the second film layer 124. Specifically, in some embodiments, the first film layer 122 is sealed to the second film layer 124 to define a sealed portion 190 surrounding the first electrode 106 and the second electrode 108. The first film layer 122 and the second film layer 124 may be sealed in any suitable manner, such as using an adhesive, heat sealing, or the like.

The first electrode 106, the second electrode 108, the first electrical insulator layer 111, and the second electrical insulator layer 112 provide a barrier that prevents the first film layer 122 from sealing to the second film layer 124 forming an unsealed portion 192. The unsealed portion 192 of the housing 110 includes the electrode region 194, in which the electrode pair 104 is provided, and the expandable fluid region 196, which is surrounded by the electrode region 194. The central openings 146, 168 of the first electrode 106 and the second electrode 108 form the expandable fluid region 196 and are arranged to be axially stacked on one another. Although not shown, the housing 110 may be cut to conform to the geometry of the electrode pair 104 and reduce the size of the artificial muscle 100, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 100 using a needle or other suitable injection device.

Referring now to FIGS. 3A and 3B, the artificial muscle 100 is actuatable between a non-actuated state and an actuated state. In the non-actuated state, as shown in FIG. 3A, the first electrode 106 and the second electrode 108 are partially spaced apart from one another proximate the central openings 146, 168 thereof and the first end 134, 156 of the tab portions 132, 154. The second end 136, 158 of the tab portions 132, 154 remain in position relative to one another due to the housing 110 being sealed at the outer perimeter 138 of the first electrode 106 and the outer perimeter 160 of the second electrode 108. In the actuated state, as shown in FIG. 3B, the first electrode 106 and the second electrode 108 are brought into contact with and oriented parallel to one another to force the dielectric fluid 198 into the expandable fluid region 196. This causes the dielectric fluid 198 to flow through the central openings 146, 168 of the first electrode 106 and the second electrode 108 and inflate the expandable fluid region 196.

Referring now to FIG. 3A, the artificial muscle 100 is shown in the non-actuated state. The electrode pair 104 is provided within the electrode region 194 of the unsealed portion 192 of the housing 110. The central opening 146 of the first electrode 106 and the central opening 168 of the second electrode 108 are coaxially aligned within the expandable fluid region 196. In the non-actuated state, the first electrode 106 and the second electrode 108 are partially spaced apart from and non-parallel to one another. Due to the first film layer 122 being sealed to the second film layer 124 around the electrode pair 104, the second end 136, 158 of the tab portions 132, 154 are brought into contact with one another. Thus, dielectric fluid 198 is provided between the first electrode 106 and the second electrode 108, thereby separating the first end 134, 156 of the tab portions 132, 154 proximate the expandable fluid region 196. Stated another way, a distance between the first end 134 of the tab portion 132 of the first electrode 106 and the first end 156 of the tab portion 154 of the second electrode 108 is greater than a distance between the second end 136 of the tab portion 132 of the first electrode 106 and the second end 158 of the tab portion 154 of the second electrode 108. This results in the electrode pair 104 zippering toward the expandable fluid region 196 when actuated. In some embodiments, the first electrode 106 and the second electrode 108 may be flexible. Thus, as shown in FIG. 3A, the first electrode 106 and the second electrode 108 are convex such that the second ends 136, 158 of the tab portions 132, 154 thereof may remain close to one another, but spaced apart from one another proximate the central openings 146, 168. In the non-actuated state, the expandable fluid region 196 has a first height H1.

When actuated, as shown in FIG. 3B, the first electrode 106 and the second electrode 108 zipper toward one another from the second ends 144, 158 of the tab portions 132, 154 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. In the actuated state, the expandable fluid region 196 has a second height H2, which is greater than the first height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary.

In order to move the first electrode 106 and the second electrode 108 toward one another, a voltage is applied by a power supply (such as power supply 48 of FIG. 7). In some embodiments, a voltage of up to 10 kV may be provided from the power supply to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122 and the first electrical insulator layer 111 to deform in a first axial direction along the center axis C of the first electrode 106 and causes the second film layer 124 and the second electrical insulator layer 112 to deform in an opposite second axial direction along the center axis C of the second electrode 108. Once the voltage being supplied to the first electrode 106 and the second electrode 108 is discontinued, the first electrode 106 and the second electrode 108 return to their initial, non-parallel position in the non-actuated state. In operation, voltage may be applied to one or multiple artificial muscles 100 of the artificial muscle stacks 201, 301, 301' of FIGS. 5A-7 to collectively and/or selectively actuate the artificial muscles 100 of the artificial muscle stacks 201, 301, 301'.

It should be appreciated that the present embodiments of the artificial muscle 100 disclosed herein, specifically, the tab portions 132, 154 with the interconnecting bridge portions 174, 176, provide a number of improvements over actuators that do not include the tab portions 132, 154, such as hydraulically amplified self-healing electrostatic (HASEL) actuators described in the paper titled "*Hydraulically amplified self-healing electrostatic actuators with muscle-like performance*" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). Embodiments of the artificial muscle 100 including two pairs of tab portions 132, 154 on each of the first electrode 106 and the second electrode 108, respectively, reduces the overall mass and thickness of the artificial muscle 100, reduces the amount of voltage required during actuation, and decreases the total volume of the artificial muscle 101 without reducing the amount of resulting force after actuation as compared to known HASEL actuators including donut-shaped electrodes having a uniform, radially-extending width. More particularly, the tab portions 132, 154 of the artificial muscle 100 provide zipping fronts that result in increased actuation power by providing localized and uniform hydraulic actuation of the artificial muscle 100 compared to HASEL actuators including donut-shaped electrodes. Specifically, one pair of tab portions 132, 154 provides twice the amount of actuator power per unit volume as compared to donut-shaped HASEL actuators, while two pairs of tab portions 132, 154 provide four times the amount of actuator power per unit volume. The bridge portions 174, 176 interconnecting the tab portions 132, 154 also limit buckling of the tab portions 132, 154 by maintaining the distance between adjacent tab portions 132, 154 during actuation. Because the bridge portions 174, 176 are integrally formed with the tab portions 132, 154, the bridge portions 174, 176 also prevent leakage between the tab portions 132, 154 by eliminating attachment locations that provide an increased risk of rupturing.

In operation, when the artificial muscle 100 is actuated, expansion of the expandable fluid region 196 produces a force of 3 Newton-millimeters (N.mm) per cubic centimeter ($cm^3$) of actuator volume or greater, such as 4 N.mm per $cm^3$ or greater, 5 N.mm per $cm^3$ or greater, 6 N.mm per $cm^3$ or greater, 7 N.mm per $cm^3$ or greater, 8 N.mm per $cm^3$ or greater, or the like. In one example, when the artificial muscle 100 is actuated by a voltage of 9.5 kilovolts (kV), the artificial muscle 100 provides a resulting force of 5 N. In another example, when the artificial muscle 100 is actuated by a voltage of 10 kV the artificial muscle 100 provides 440% strain under a 500 gram load.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by the central openings 146, 168 in the first electrode 106 and the second electrode 108. Thus, the degree of displacement within the expandable fluid region 196 may alternatively, or in addition, be controlled by increasing or reducing the size of the central openings 146, 168.

As shown in FIGS. 4A and 4B, another embodiment of an artificial muscle 100' is illustrated. The artificial muscle 100' is substantially similar to the artificial muscle 100. As such, like structure is indicated with like reference numerals. However, as shown, the first electrode 106 does not include a central opening. Thus, only the second electrode 108 includes the central opening 168 formed therein. As shown in FIG. 8, the artificial muscle 100' is in the non-actuated state with the first electrode 106 being planar and the second electrode 108 being convex relative to the first electrode 106. In the non-actuated state, the expandable fluid region 196 has a first height H3. In the actuated state, as shown in FIG. 4B, the expandable fluid region 196 has a second height H4, which is greater than the first height H3. It should be appreciated that by providing the central opening 168 only in the second electrode 108 as opposed to both the first electrode 106 and the second electrode 108, the total deformation may be formed on one side of the artificial muscle 100'. In addition, because the total deformation is formed on only one side of the artificial muscle 100', the second height H4 of the expandable fluid region 196 of the artificial muscle 100' extends further from a longitudinal axis perpendicular to the central axis C of the artificial muscle 100' than the second height H2 of the expandable fluid region 196 of the artificial muscle 100 when all other dimensions, orientations, and volume of dielectric fluid are the same.

Referring now to FIGS. 5A-7, artificial muscle stacks 201, 301, 301' are depicted. In FIGS. 5A-7, each artificial muscle stack 201,301, 301' comprises a plurality of artificial muscle layers 210, 310 and each of the plurality of artificial muscle layers 210, 310 comprise one of more artificial muscles 100. In some embodiments, the plurality of artificial muscle layers may alternatively or additionally comprise the artificial muscles 100' of FIGS. 4A and 4B). In operation, artificial muscle stacks 201, 301, 301' generate more actuation force than a single artificial muscle 100. FIGS. 5A-7 depict a few different stack arrangements that may be used to generate increased actuation force.

Figure 5A:
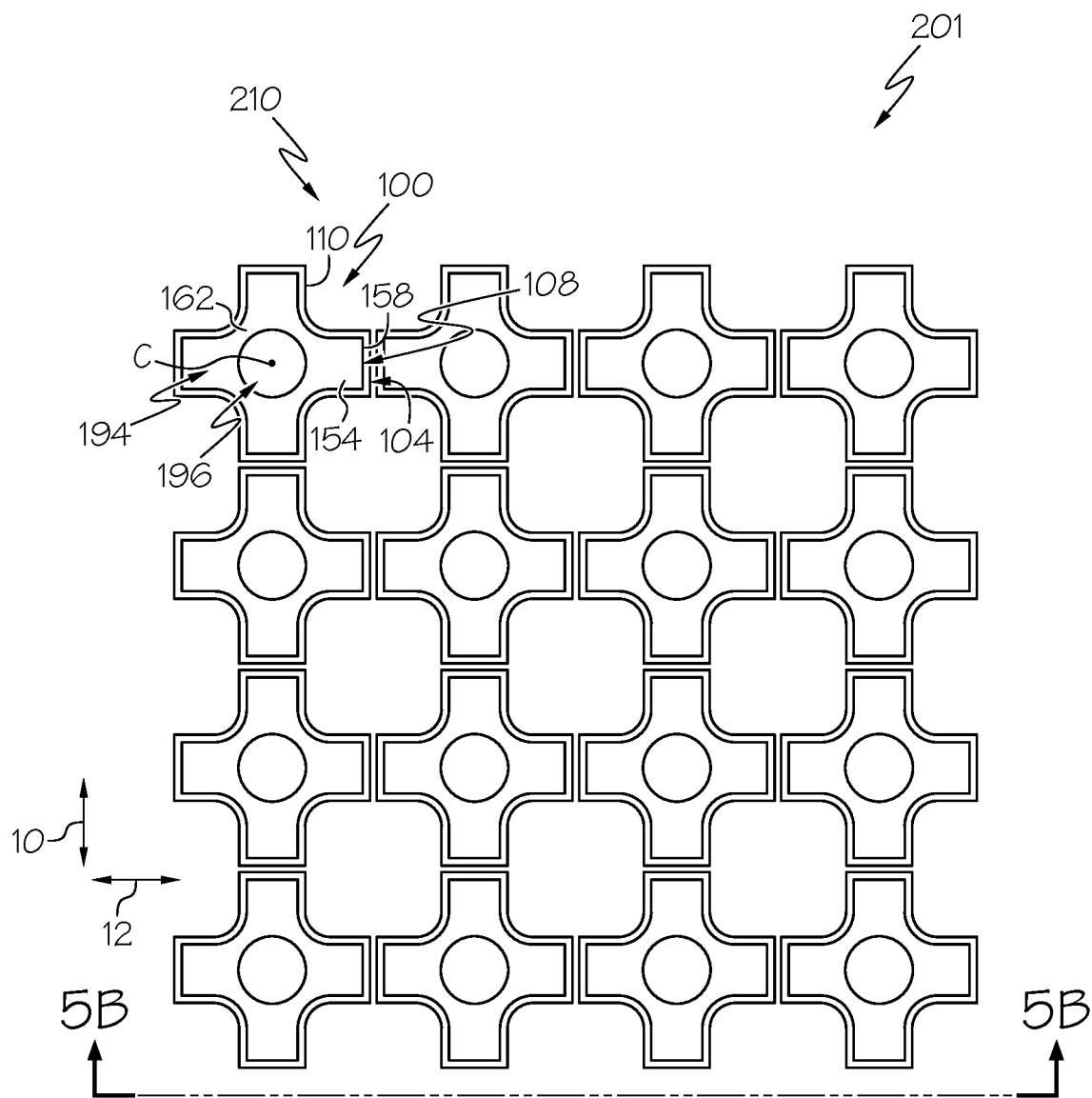
FIG. 5A schematically depicts a top view of an example artificial muscle stack comprising a plurality of artificial muscle layers positioned in a coaxial alignment, according to one or more embodiments shown and described herein.
Figure 5B:
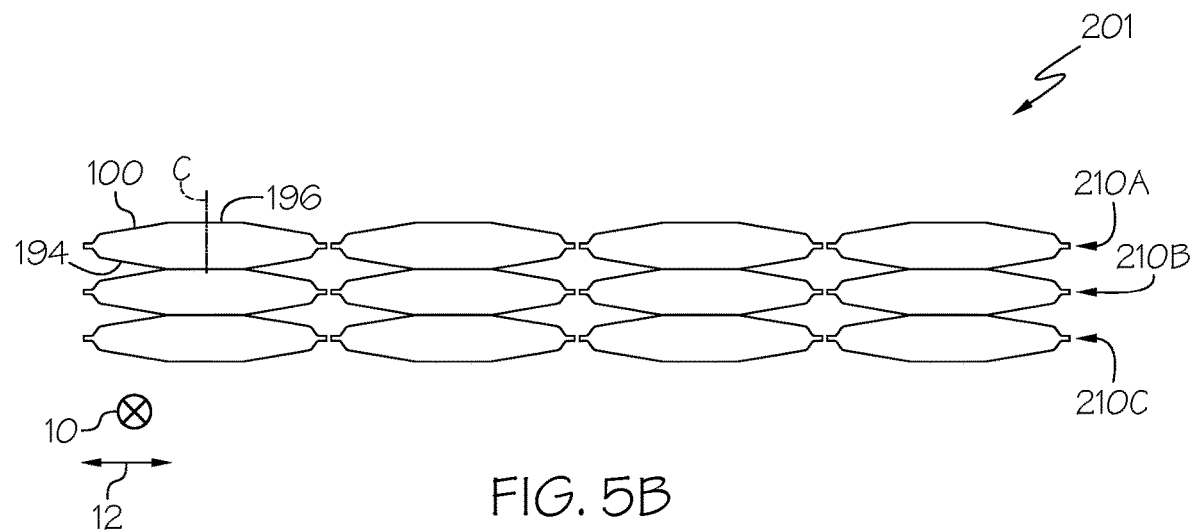
FIG. 5B schematically depicts a side view of the artificial muscle stack of FIG. 5A along line 5B-5B in an unactuated state, according to one or more embodiments shown and described herein.
Figure 5C:
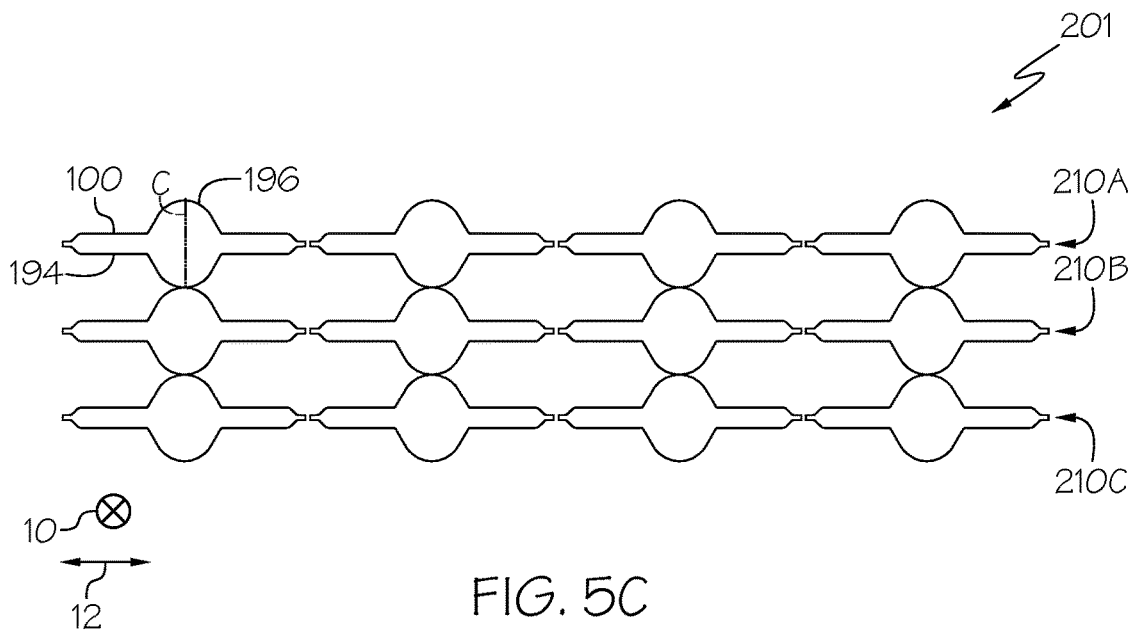
FIG. 5C schematically depicts a side view of the artificial muscle stack of FIG. 5A along line 5B-5B in an actuated state, according to one or more embodiments shown and described herein.

The artificial muscle stack 201 of FIGS. 5A-5C comprises a plurality of artificial muscle layers 210 disposed in coaxial alignment, such that expandable fluid regions 196 of each individual artificial muscle 100 of an individual artificial muscle layer 210 is in coaxial alignment with an individual artificial muscle 100 of each of the other individual artificial muscle layers 210. As shown in the side view of FIGS. 5B and 5C, the artificial muscle stack 201 comprises three artificial muscle layers 210A-210C. It should be understood that any number of artificial muscle layers 210 is contemplated. FIG. 5B depicts the artificial muscle stack 201 in an unactuated state and FIG. 5C depicts the artificial muscle stack 201 in an actuated state. In each layer of the artificial muscle stack 201, individual artificial muscles 100 do not overlap. Thus, while the artificial muscle stack 201 of FIGS. 5A-5B may generate a collective actuation force, the coaxial alignment of the individual artificial muscles 100 of each artificial muscle layer 210 creates a large footprint. To reduce the footprint of the arrangement of artificial muscles, the artificial muscle stack 301 depicted in FIGS. 6A-6E may be implemented.

Figure 6A:
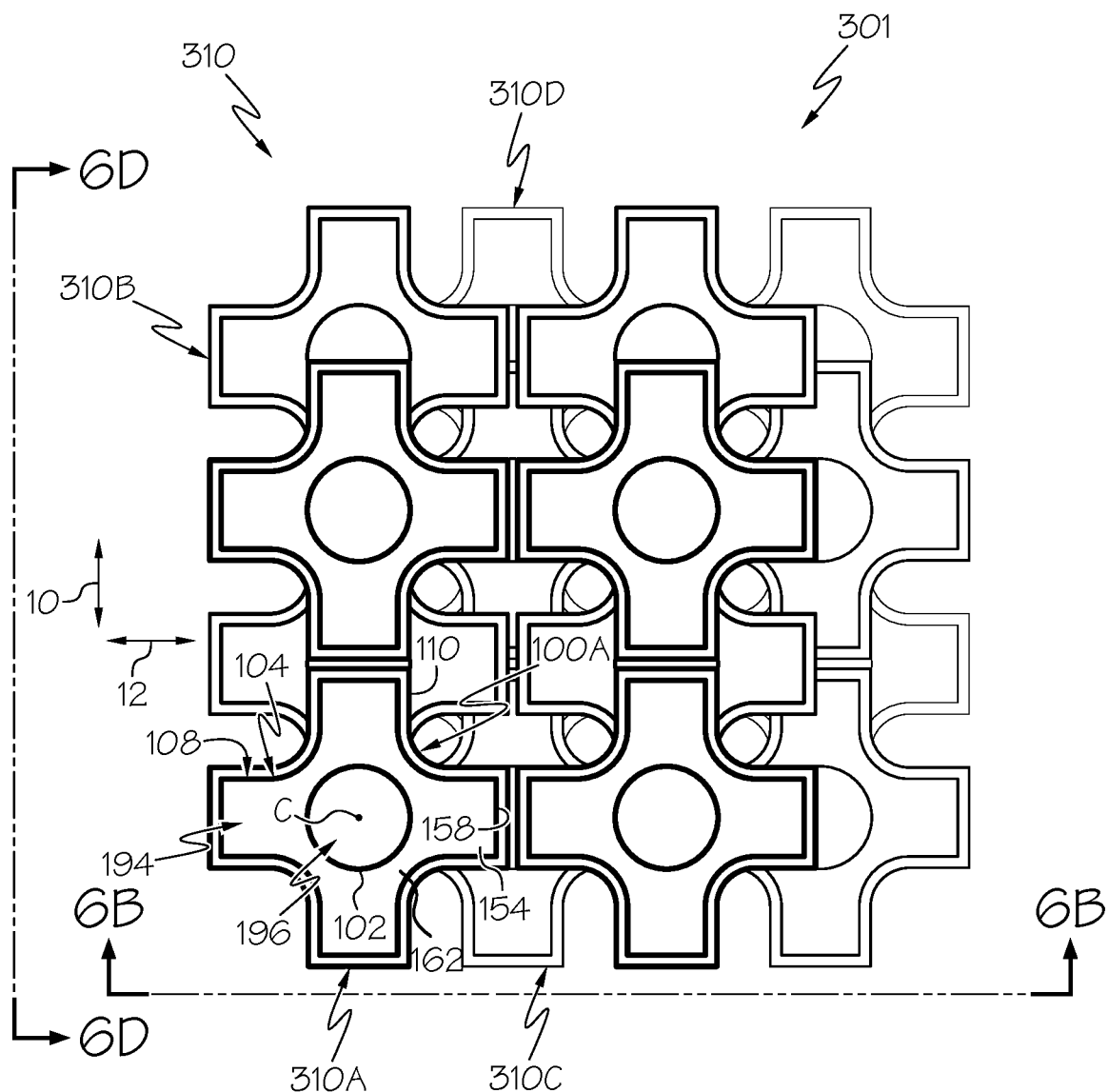
FIG. 6A schematically depicts a top view of an example artificial muscle stack comprising a plurality of artificial muscle layers positioned in alternatingly offset arrangement, according to one or more embodiments shown and described herein.
Figure 6B:
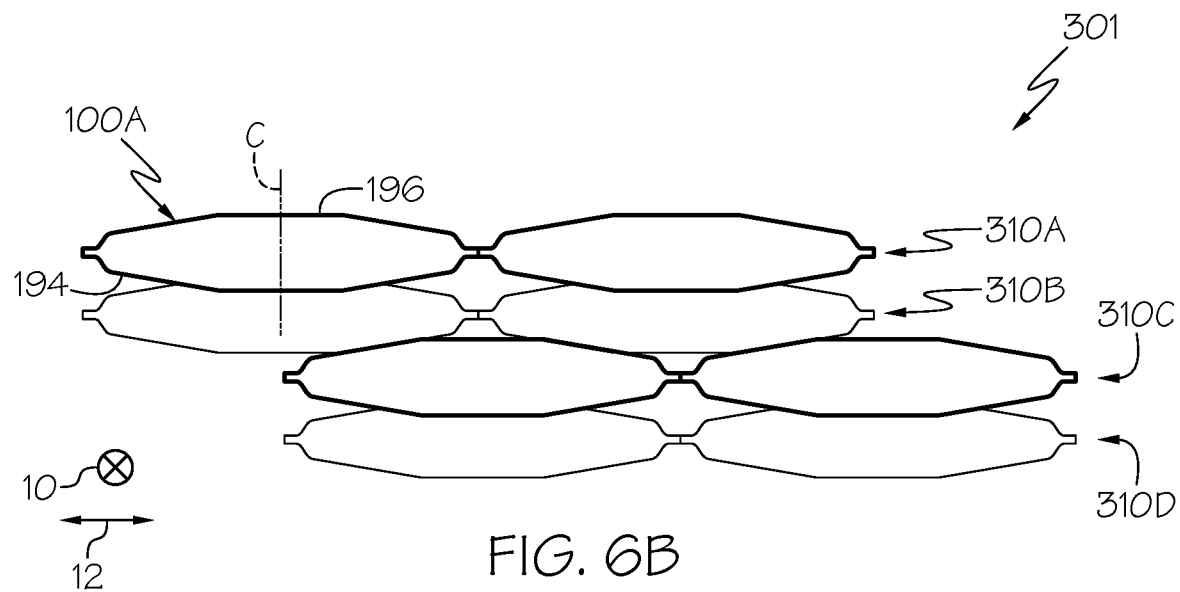
FIG. 6B schematically depicts a side view of the artificial muscle stack of FIG. 6A along line 6B-6B in an unactuated state, according to one or more embodiments shown and described herein.
Figure 6C:
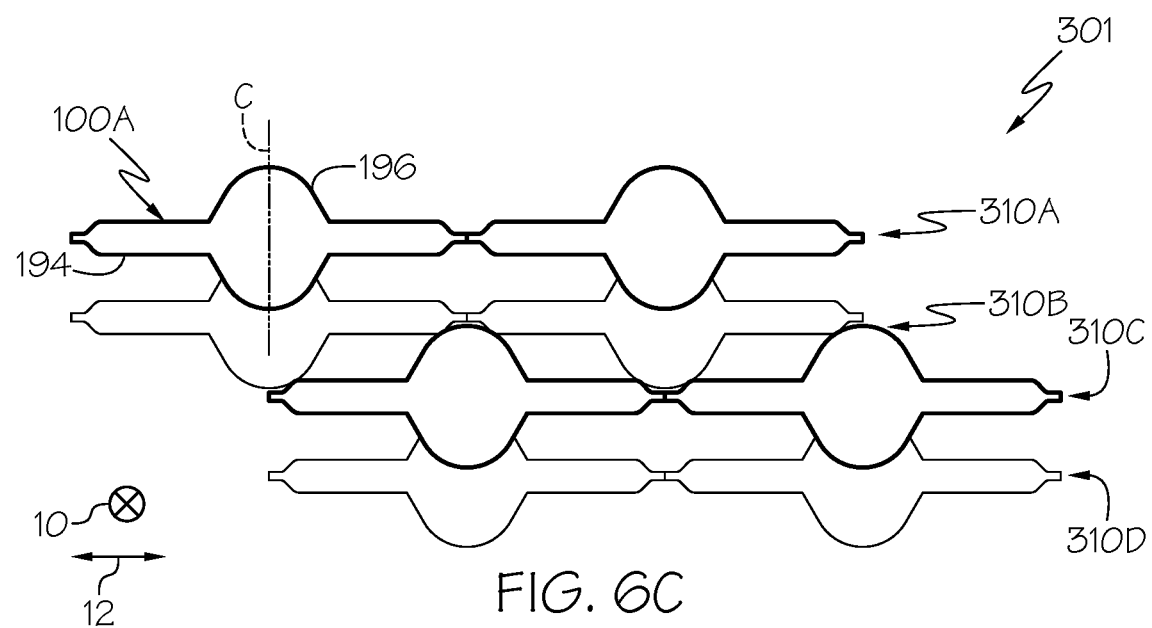
FIG. 6C schematically depicts a side view of the artificial muscle stack of FIG. 6A along line 6B-6B in an actuated state, according to one or more embodiments shown and described herein.
Figure 6D:
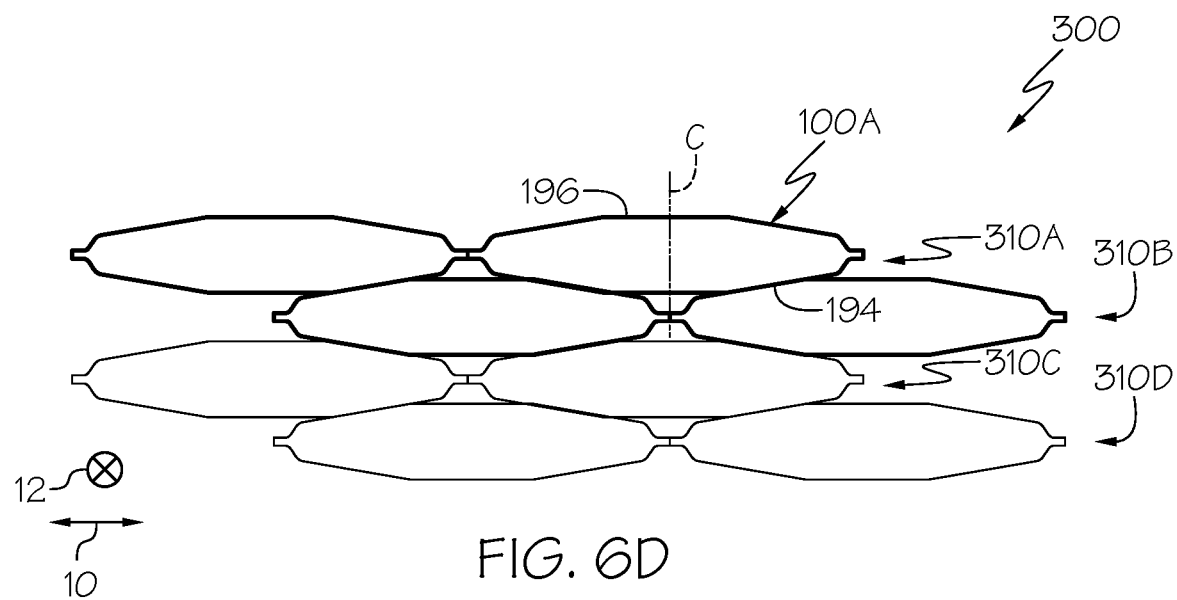
FIG. 6D schematically depicts a side view of the artificial muscle stack of FIG. 6A along line 6D-6D in an unactuated state, according to one or more embodiments shown and described herein.
Figure 6E:
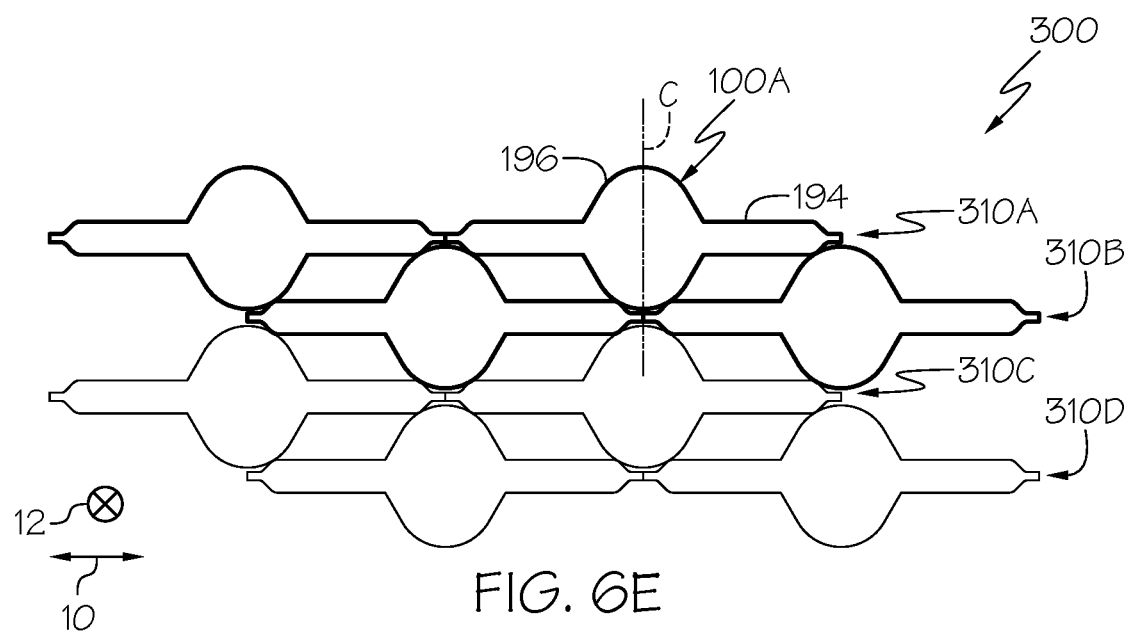
FIG. 6E schematically depicts a side view of the artificial muscle stack of FIG. 6A along line 6D-6D in an unactuated state, according to one or more embodiments shown and described herein.

The artificial muscle stack 301 of FIGS. 6A-6E, comprises a plurality of artificial muscle layers 310 arranged in an alternatingly offset arrangement. The artificial muscle stack 301 comprises four artificial muscle layers 310, a first artificial muscle layer 310A, a second artificial muscle layer 310B, a third artificial muscle layer 310C, and a fourth artificial muscle layer 310D. FIG. 6A is a top view of the artificial muscle stack 301 and FIGS. 6B-6E are side views of the artificial muscle stack 301. FIGS. 6B and 6C show a side view of the artificial muscle stack 301 along line 6B-6B in an unactuated state (FIG. 6B) and in an actuated state (FIG. 6C). FIGS. 6D and 6E show a side view of the artificial muscle stack 301 along line 6D-6D in an unactuated state (FIG. 6D) and in an actuated state (FIG. 6E). Line 6B-6B is orthogonal to line 6D-6D and thus FIGS. 6B and 6C show a different side of the artificial muscle stack 301 than FIGS. 6D and 6E and the side shown by FIGS. 6B and 6C is orthogonal to the side shown by FIGS. 6D and 6E.

Each artificial muscle layer 310 comprises one or more artificial muscles 100, for example, a plurality of artificial muscles 100. For example, in FIG. 6A, a first artificial muscle 100A is illustrative of the artificial muscles 100 of the artificial muscle stack 301. It should be understood that embodiments are contemplated in which some of the artificial muscle layers 310 of the artificial muscle stack 301 comprises a single artificial muscle 100. In the alternating offset arrangement of the artificial muscle stack 301 depicted in FIGS. 6A-6E, the plurality of artificial muscle layers 310 are arranged such that each expandable fluid region 196 of the housing 110 of the one or more artificial muscles 100 of each artificial muscle layer 310 overlaps at least one tab portion 132, 154 of one or more artificial muscles 100 of an adjacent artificial muscle layer 310. In other words, each expandable fluid region 196 of the housing 110 of the one or more artificial muscles 100 of each artificial muscle layer 310 overlaps the electrode region 194 of the housing 110 of one or more artificial muscles 100 of an adjacent artificial muscle layer 310. In some embodiments, an individual tab portion 132, 154 of one artificial muscle 100 may overlap the expandable fluid region 196 of an artificial muscle 100 in an adjacent artificial muscle layer 310 such that the second end 136, 158 of the individual tab portion 132, 154 terminates at or near the center axis C of the expandable fluid region 196 of the artificial muscle 100 in the adjacent muscle layer 310. Thus, some of the expandable fluid regions 196 may be overlapped by two tab portions 132, 154, each from a different artificial muscle 100, on one or both sides of the expandable fluid region 196. The tab portions 154 of the second electrode 108 of the electrode pair 104 are shown in FIG. 6A but it should be understood that the electrode pair 104 also includes the first electrode 106 with tab portions 132.

To illustrate the alternatingly offset arrangement of the artificial muscle stack 301 in FIGS. 6A-6E, relative line thickness of the artificial muscles 100 of each artificial muscle layer 310 is used to illustrate a relative spatial positioning of the respective artificial muscle layers 310. For example, in FIG. 6A, the first artificial muscle layer 310A is the top layer, so the artificial muscles 100 of the first artificial muscle layer 310A are depicted with the widest line thickness of the plurality of artificial muscle layers 310. Similarly, in FIG. 6A, the fourth artificial muscle layer 310D is the bottom layer, so the artificial muscles 100 of the fourth artificial muscle layer 310D are depicted with the narrowest line thickness of the plurality artificial muscle layers 310.

In the alternatingly offset arrangement of the artificial muscle stack 301, adjacent artificial muscle layers 310 of the artificial muscle stack 301 are offset from one another along one or more tab axes, such as a first tab axis 10 or a second tab axis 12. Each tab axis extends from a center axis C of the expandable fluid region 196 of an individual artificial muscle 100 of the plurality of artificial muscle layers 310 to an end (i.e., the second end 136, 158) of at least one of the tab portions 132, 154 of the individual artificial muscle 100 of the plurality of artificial muscle layers 310. As the embodiments of the artificial muscles 100 of the artificial muscle stack 301 depicted in FIGS. 6A-6E each comprise four tab portions 132, 154 arranged in diametrically opposed pairs, the first tab axis 10 is orthogonal the second tab axis 12. While the artificial muscles 100 of the artificial muscle stack 310 comprise four tab portions 132, 154 (i.e., each electrode of the electrode pair 104 of each artificial muscles 100 comprises four tab portions 132, 154), it should be understood that embodiments are contemplated with artificial muscles 100 comprising more or less than four tab portions 132, 154. These embodiments may comprise more than two tab axis, such as in an embodiment with three tab portions per electrode, five tab portions per electrode, or six tab portions per electrode, or just a single tab axis, such as embodiments comprising a single pair of diametrically opposed tab portions. Moreover, it should be understood that embodiments are contemplated in which other artificial muscle designs are arranged in an alternatingly offset arrangement, for example, triangular or rectangular artificial muscles.

Referring still to FIGS. 6A-6E, embodiments of the artificial muscle stack 301 comprising at least three artificial muscle layers 310 include at least one inner artificial muscle layer, which is an artificial muscle layer 310 adjacent two other artificial muscle layers 310. In these embodiments, each inner artificial muscle layer is offset a first adjacent artificial muscle layer along a first tab axis 10 and offset a second adjacent artificial muscle layer along a second tab axis 12. This multi-axis offset is depicted in the side views of FIGS. 6B-6E by a lateral shift, which shows offset along one tab axis, and by a relative line thickness, which shows offset along the other tab axis. In FIGS. 6B and 6C, offsets between artificial muscle layers 310 along the second tab axis 12 are shown by a lateral shift and offsets between adjacent artificial muscle layers 310 along the first tab axis 10 are shown by a relative line thickness. In particular, a wider line thickness in FIGS. 6B and 6C denotes artificial muscle layers 310 shifted along the first tab axis 10 into the foreground (i.e., out of the page) and a narrower line thickness in FIGS. 6B and 6C denotes artificial muscle layers 310 shifted along the first tab axis 10 into the background (i.e., into the page). In FIGS. 6D and 6E, offsets between artificial muscle layers 310 along the first tab axis 10 are shown by a lateral shift and offsets between adjacent artificial muscle layers 310 along the second tab axis 12 are shown by a relative line thickness. In particular, a wider line thickness in FIGS. 6D and 6E denotes artificial muscle layers 310 shifted along the second tab axis 12 into the foreground (i.e., out of the page) and a narrower line thickness in FIGS. 6D and 6E denotes artificial muscle layers 310 shifted along the second tab axis 12 into the background (i.e., into the page).

In FIGS. 6A-6E, the second artificial muscle layer 310B and the third artificial muscle layer 310C are inner artificial muscle layers. The second artificial muscle layer 310B is offset from the first artificial muscle layer 310A along the first tab axis 10 and offset from the third artificial muscle layer 310C along the second tab axis 12. The third artificial muscle layer 310C is offset from the second artificial muscle layer 310B along the second tab axis 12 and offset from the fourth artificial muscle layer 310D along the first tab axis 10. In artificial muscle stacks 301 with increased numbers of artificial muscle layers 310, this pattern may repeat allowing for a closely packed stacked arrangement of artificial muscle layers.

Referring still to FIGS. 6A-6E, the overlap between the tab portions 132, 154 and expandable fluid regions 196 in adjacent artificial muscle layers 310 in the alternatingly offset arrangement of the artificial muscle stack 301 allows an increased number artificial muscles 100 to be disposed within a particular footprint when compared to the artificial muscle stack 201 of FIGS. 5A-5C. Indeed, the artificial muscle stack 301 maximizes the number of artificial muscles 100 that may be disposed in a particular footprint, in both a lateral direction (i.e., along the first and second tab axes 10, 12) and in a depth direction, maximizing the collective actuation force per unit volume of the artificial muscle stack 301. When each artificial muscle 100 actuates, the tab portions 132, 154 of the electrode pair 104 close together (e.g., flatten) and the expandable fluid region expands 196. Because the tab portions 132, 154 flatten, expandable fluid regions 196 of artificial muscles 100 may be positioned above and/or below tab portions of adjacent artificial muscle layers 310. This allows an increased number of artificial muscles to be positioned together in a condensed block (i.e., the artificial muscle stack 301) and operate cooperatively. Indeed, the artificial muscle stack 301 is designed such that the artificial muscles 100 of each artificial muscle layer 310 are able to express their collective force in an additive manner. In contrast, the coaxial alignment of the artificial muscle stack 201 of FIG. 5A limits the additive force generated by each artificial muscle layer 210 because the expandable fluid regions 196 of each artificial muscle layer 210 overlap.

Referring now to FIG. 7, the artificial muscle stack 301' is depicted. The artificial muscle stack 301' comprises the artificial muscle stack 301 of FIGS. 6A-6E with the addition of perimeter artificial muscles 315. The perimeter artificial muscles 315 comprise the same structure as the artificial muscles 100 but have fewer tab portions 132, 154 than the artificial muscles 100 of the artificial muscle stack 301', as shown by first perimeter artificial muscles 315A. As shown in FIG. 7, the artificial muscles 100 of the artificial muscle stack 301' comprise four tab portions 132, 154 and the perimeter artificial muscles 315 comprise either two or three tab portions 132, 154. In particular, the perimeter artificial muscles 315 may comprise edge perimeter artificial muscles 316 and corner perimeter artificial muscles 318. The edge perimeter artificial muscles 316 extend along a single side of the artificial muscle stack 301 and the corner perimeter artificial muscles 318 are disposed at a corner of the artificial muscle stack 301 such that one tab portion of the corner perimeter artificial muscles 318 extends along one side of the artificial muscle stack 301 and another tab of the corner perimeter artificial muscle 318 extend along another side of the artificial muscle stack 301.

As shown in FIGS. 6A-6E, the alternating offset arrangement of the plurality of artificial muscle layers 310 of the artificial muscle stack 301 creates a symmetry imbalance along the edges of the artificial muscle stack 301. That is, due to the alternating offset arrangement, the artificial muscle layers 310 may laterally terminate at different locations, leaving edge gaps in the artificial muscle stack 301. As shown in FIG. 7, the perimeter artificial muscles 315 may be used to fill these edge gaps such that each artificial muscle layer 310 of the artificial muscle stack 301' are laterally coterminous. In some embodiments, each artificial muscle layer 310 may comprise perimeter artificial muscles 315, for example, a combination of edge perimeter artificial muscles 316 and corner perimeter artificial muscle 318 to both balance the symmetric along the edges of the artificial muscles stack 301 and add additional actuation force to the artificial muscle stack 301 without increasing the overall footprint.

Referring now to FIG. 8, an actuation system 400 may be provided for operating each individual artificial muscle 100 of the artificial muscle stacks 201, 301, 301'. The actuation system 400 may comprise a controller 50, an operating device 46, a power supply 48, a display device 42, network interface hardware 44, and a communication path 41 communicatively coupled these components.

The controller 50 comprises a processor 52 and a non-transitory electronic memory 54 to which various components are communicatively coupled. In some embodiments, the processor 52 and the non-transitory electronic memory 54 and/or the other components are included within a single device. In other embodiments, the processor 52 and the non-transitory electronic memory 54 and/or the other components may be distributed among multiple devices that are communicatively coupled. The controller 50 includes non-transitory electronic memory 54 that stores a set of machine-readable instructions. The processor 52 executes the machine-readable instructions stored in the non-transitory electronic memory 54. The non-transitory electronic memory 54 may comprise RAM, ROM, flash memories, hard drives, or any device capable of storing machine-readable instructions such that the machine-readable instructions can be accessed by the processor 52. Accordingly, the actuation system 400 described herein may be implemented in any conventional computer programming language, as pre-programmed hardware elements, or as a combination of hardware and software components. The non-transitory electronic memory 54 may be implemented as one memory module or a plurality of memory modules.

In some embodiments, the non-transitory electronic memory 54 includes instructions for executing the functions of the actuation system 400. The instructions may include instructions for operating the artificial muscle stacks 201, 301, 301', for example, instructions for actuating the one or more artificial muscles 100, individually or collectively, and actuating the artificial muscle layers 210, 310, individually or collectively.

The processor 52 may be any device capable of executing machine-readable instructions. For example, the processor 52 may be an integrated circuit, a microchip, a computer, or any other computing device. The non-transitory electronic memory 54 and the processor 52 are coupled to the communication path 41 that provides signal interconnectivity between various components and/or modules of the actuation system 400. Accordingly, the communication path 41 may communicatively couple any number of processors with one another, and allow the modules coupled to the communication path 41 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 8, the communication path 41 communicatively couples the processor 52 and the non-transitory electronic memory 54 of the controller 50 with a plurality of other components of the actuation system 400. For example, the actuation system 400 depicted in FIG. 8 includes the processor 52 and the non-transitory electronic memory 54 communicatively coupled with the operating device 46 and the power supply 48.

The operating device 46 allows for a user to control operation of the artificial muscles 100 of the artificial muscle stacks 201, 301, 301'. In some embodiments, the operating device 46 may be a switch, toggle, button, or any combination of controls to provide user operation. The operating device 46 is coupled to the communication path 41 such that the communication path 41 communicatively couples the operating device 46 to other modules of the actuation system 400. The operating device 46 may provide a user interface for receiving user instructions as to a specific operating configuration of the artificial muscle stacks 201, 301, 301'.

The power supply 48 (e.g., battery) provides power to the one or more artificial muscles 100 of the artificial muscle stacks 201, 301, 301'. In some embodiments, the power supply 48 is a rechargeable direct current power source. It is to be understood that the power supply 48 may be a single power supply or battery for providing power to the one or more artificial muscles 100 of the artificial muscle stacks 201, 301, 301'. A power adapter (not shown) may be provided and electrically coupled via a wiring harness or the like for providing power to the one or more artificial muscles 100 of the artificial muscle stacks 201, 301, 301' via the power supply 48.

In some embodiments, the actuation system 400 also includes a display device 42. The display device 42 is coupled to the communication path 41 such that the communication path 41 communicatively couples the display device 42 to other modules of the actuation system 400. The display device 42 may be a touchscreen that, in addition to providing optical information, detects the presence and location of a tactile input upon a surface of or adjacent to the display device 42. Accordingly, the display device 42 may include the operating device 46 and receive mechanical input directly upon the optical output provided by the display device 42.

In some embodiments, the actuation system 400 includes network interface hardware 44 for communicatively coupling the actuation system 400 to a portable device 70 via a network 60. The portable device 70 may include, without limitation, a smartphone, a tablet, a personal media player, or any other electric device that includes wireless communication functionality. It is to be appreciated that, when provided, the portable device 70 may serve to provide user commands to the controller 50, instead of the operating device 46. As such, a user may be able to control or set a program for controlling the artificial muscles 100 of the artificial muscle stacks 201, 301, 301' utilizing the controls of the operating device 46. Thus, the artificial muscles 100 of the artificial muscle stacks 201, 301, 301' may be controlled remotely via the portable device 70 wirelessly communicating with the controller 50 via the network 60.

It should now be understood that embodiments described herein are directed to artificial muscle stacks comprising a plurality of artificial muscle layers stacked in an alternatingly offset arrangement such that each expandable fluid region of the one or more artificial muscles of each artificial muscle layer overlaps at least one tab portion of one or more artificial muscles of an adjacent artificial muscle layers. This alternating offset arrangement increases the number of artificial muscles that may be arrangement in a particular footprint to form small footprint artificial muscle stacks capable of achieving a large actuation force per unit volume of the artificial muscle stack.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An artificial muscle stack comprising:
a plurality of artificial muscle layers, wherein each artificial muscle layer comprises one or more artificial muscles, the one or more artificial muscles comprising:
a housing comprising an electrode region and an expandable fluid region;
a dielectric fluid housed within the housing; and
an electrode pair comprising a first electrode and a second electrode positioned in the electrode region of the housing, wherein:
the first electrode and the second electrode each comprise two or more tab portions and two or more bridge portions;
each of the two or more bridge portions interconnects adjacent tab portions; and
at least one of the first electrode and the second electrode comprises a central opening positioned between the two or more tab portions and encircling the expandable fluid region; and
wherein the plurality of artificial muscle layers are arranged such that the expandable fluid region of the one or more artificial muscles of each artificial muscle layer overlaps at least one tab portion of one or more artificial muscles of an adjacent artificial muscle layer.

2. The artificial muscle stack of claim 1, wherein adjacent artificial muscle layers are offset from one another along one or more tab axes, each tab axis extending from a center axis of the expandable fluid region of an individual artificial muscle of the plurality of artificial muscle layers to an end of at least one of the two or more tab portions of the individual artificial muscle of the plurality of artificial muscle layers.

3. The artificial muscle stack of claim 2, wherein the plurality of artificial muscle layers comprise at least three artificial muscle layers and each inner artificial muscle layer is offset a first adjacent artificial muscle layer along a first tab axis and offset a second adjacent artificial muscle layer along a second tab axis.

4. The artificial muscle stack of claim 3, wherein the first tab axis is orthogonal the second tab axis.

5. The artificial muscle stack of claim 1, wherein:
at least one of the plurality of artificial muscle layers further comprises one or more perimeter artificial muscles; and
the one or more perimeter artificial muscles comprise fewer tab portions then the other artificial muscles of the at least of the plurality of artificial muscle layers.

6. The artificial muscle stack of claim 1, wherein each of the plurality of artificial muscle layers comprises a plurality of artificial muscles.

7. The artificial muscle stack of claim 1, wherein the first electrode and the second electrode each includes two pairs of tab portions and two pairs of bridge portions, each bridge portion interconnecting adjacent a pair of adjacent tab portions, each tab portion diametrically opposing an opposite tab portion.

8. The artificial muscle stack of claim 1, wherein the first electrode is fixed to a first surface of the housing and the second electrode is fixed to a second surface of the housing.

9. The artificial muscle stack of claim 1, wherein the electrode pair is actuatable between a non-actuated state and an actuated state such that actuation from the non-actuated state to the actuated state directs the dielectric fluid into the expandable fluid region, expanding the expandable fluid region.

10. The artificial muscle stack of claim 9, wherein:
when the electrode pair is in the non-actuated state, the first electrode and the second electrode are non-parallel to one another; and
when the electrode pair is in the actuated state, the first electrode and the second electrode are parallel to one another, such that the first electrode and the second electrode are configured to zipper toward one another and toward the central opening when actuated from the non-actuated state to the actuated state.

11. The artificial muscle stack of claim 1, further comprising a first electrical insulator layer fixed to an inner surface of the first electrode opposite a first surface of the housing and a second electrical insulator layer fixed to an inner surface of the second electrode opposite a second surface of the housing, wherein the first electrical insulator layer and the second electrical insulator layer each includes an adhesive surface and an opposite non-sealable surface.

12. An artificial muscle stack comprising:
three or more artificial muscle layers, wherein each artificial muscle layer comprises one or more artificial muscles, the one or more artificial muscles comprising:
a housing comprising an electrode region and an expandable fluid region;
a dielectric fluid housed within the housing; and
an electrode pair comprising a first electrode and a second electrode positioned in the electrode region of the housing, wherein:
the first electrode and the second electrode each comprise two or more tab portions and two or more bridge portions;
each of the two or more bridge portions interconnects adjacent tab portions; and
at least one of the first electrode and the second electrode comprises a central opening positioned between the two or more tab portions and encircling the expandable fluid region; and
wherein:
each inner artificial muscle layer is offset a first adjacent artificial muscle layer along a first tab axis and offset a second adjacent artificial muscle layer along a second tab axis; and
each tab axis extends from a center axis of the expandable fluid region to an end of at least one of the two or more tab portions of the one or more artificial muscles of the inner artificial muscle layer.

13. The artificial muscle stack of claim 12, wherein the first tab axis is orthogonal the second tab axis.

14. The artificial muscle stack of claim 12, wherein the electrode pair is actuatable between a non-actuated state and an actuated state such that actuation from the non-actuated state to the actuated state directs the dielectric fluid into the expandable fluid region, expanding the expandable fluid region.

15. The artificial muscle stack of claim 12, wherein the first electrode is fixed to a first surface of the housing and the second electrode is fixed to a second surface of the housing.

16. The artificial muscle stack of claim 12, wherein each of the three or more artificial muscle layers comprises a plurality of artificial muscles.

17. A method for actuating an artificial muscle stack, the method comprising:
generating a voltage using a power supply electrically coupled to an electrode pair of each artificial muscle of a plurality of artificial muscle layers, wherein:
each artificial muscle comprises a housing having an electrode region and an expandable fluid region;
a dielectric fluid is housed within the housing; and
the electrode pair comprises a first electrode and a second electrode and is positioned in the electrode region of the housing, wherein:
the first electrode and the second electrode each comprise two or more tab portions and two or more bridge portions;
each of the two or more bridge portions interconnects adjacent tab portions; and
at least one of the first electrode and the second electrode comprises a central opening positioned between the two or more tab portions and encircling the expandable fluid region, wherein the plurality of artificial muscle layers are arranged such that the expandable fluid region of each artificial muscle of each artificial muscle layer overlaps at least one tab portion of one or more artificial muscles of an adjacent artificial muscle layer; and
applying the voltage to the electrode pair of at least one artificial muscle of at least one of the plurality of artificial muscle layers, thereby actuating the electrode pair of the at least one artificial muscle from a non-actuated state to an actuated state such that dielectric fluid is directed into the expandable fluid region of the housing and expands the expandable fluid region.

18. The method of claim 17, wherein adjacent artificial muscle layers are offset from one another along one or more tab axes, each tab axis extending from a center axis of the expandable fluid region of an individual artificial muscle of the plurality of artificial muscle layers to an end of at least one of the two or more tab portions of the individual artificial muscle of the plurality of artificial muscle layers.

19. The method of claim 18, wherein the plurality of artificial muscle layers comprise at least three artificial muscle layers and each inner artificial muscle layer is offset a first adjacent artificial muscle layer along a first tab axis and offset a second adjacent artificial muscle layer along a second tab axis.

20. The method of claim 17, the method further comprising applying the voltage to the electrode pair of each artificial muscle of each of the plurality of artificial muscle layers, thereby actuating the electrode pair of each artificial muscle from the non-actuated state to the actuated state such that dielectric fluid is directed into the expandable fluid region of the housing of each artificial muscle, expanding the expandable fluid region of each artificial muscle.

* * * * *